Oct. 12, 1926.

F. L. MORSE 1,602,697

DRIVE CHAIN

Filed Dec. 31, 1924

INVENTOR
Frank L. Morse
BY
Symmestredt & Lechner
ATTORNEYS

Patented Oct. 12, 1926.

1,602,697

UNITED STATES PATENT OFFICE.

FRANK L. MORSE, OF ITHACA, NEW YORK, ASSIGNOR TO MORSE CHAIN COMPANY, A CORPORATION OF NEW YORK.

DRIVE CHAIN.

Application filed December 31, 1924. Serial No. 758,972.

This invention relates to drive chains and more particularly to those in which the links are formed of a plurality of plates.

The usual procedure in constructing chains of this general type is to make the plates of stampings and to punch the holes for the joint pins. It has been found, due to inaccuracy in punching, that there is some variation in the link plates therefore it is very difficult to make the tooth engaging faces of the plates align when assembling the chain. In other words if all the plates going to make up a link are not exactly alike the teeth of the sprocket wheel will not come into engagement with each plate of the link and bending strains on the joint pins will be the result. The general practice has been to grind the tooth engaging faces thus aligning the faces of the plates, but this it may be well understood is a costly procedure, extra shop equipment being needed as well as considerable time. In the manufacture of simple and inexpensive chains these extra costs are very objectionable.

The object of my present invention is to overcome the above difficulties arising from inaccuracies in punching without the use of extra shop equipment and without causing work to be done on the chain after assembly thereby providing a chain of novel, inexpensive and efficient construction.

How the foregoing together with such other objects and advantages as may hereinafter appear can be realized through my invention is set forth in the accompanying drawings and appended claims.

Figure 1:
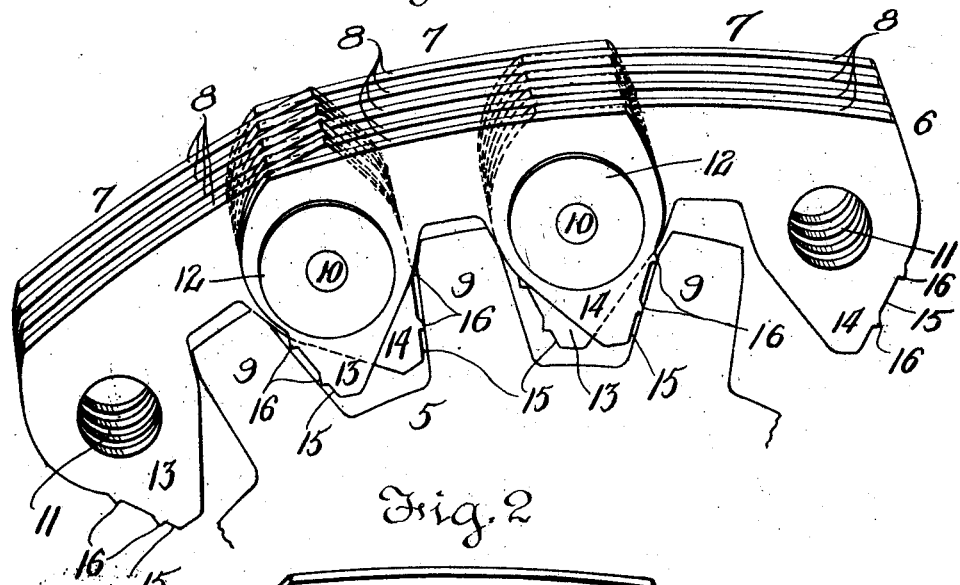

In the drawings Fig. 1 is a perspective view of a portion of a chain, the link plates of which are constructed in accordance with my invention with a fragment of the sprocket wheel diagrammatically shown.

Figure 2:
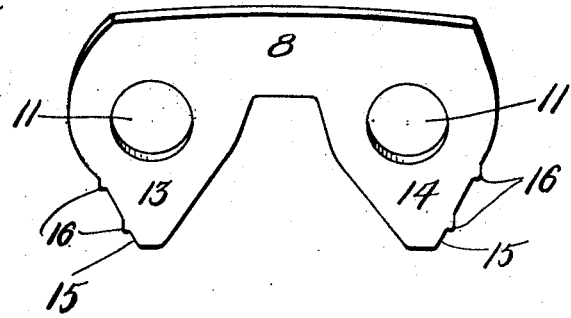

Fig. 2 is a perspective view of one of the link plates.

Referring to the drawings the reference numeral 5 designates a sprocket wheel over which the chain indicated as a whole by the numeral 6 passes. Each link 7 of the chain 6 is composed of a plurality of plates 8 punched out of sheet metal stock arranged in interspersed relation and adapted to arch over the sprocket teeth 9. The plates of adjoining links are connected by joint pins 10 preferably although not exclusively of the two part pintle type, extending through the opening 11 in the link plates.

The links of the chain are held together in any suitable manner such as for instance by riveting the washers 12 upon the outside end of the joint pins.

From the above it will be understood that the multiple plate chain as thus far described may be constructed in any one of a number of ways now in extensive use. This construction is not claimed as part of the invention, but merely described to give a full understanding of the novel application of and advantages derived from the use of the wearing in means now to be described.

When it is understood that in punching out the link plates certain inaccuracies occur it may well be realized that upon assembling the plates, the outer faces 15, would not fall in exact alignment so that all of the plates making up a link would not have driving contact with the sprocket teeth. This creates bending strains on the joint pins eventually becoming very troublesome.

In order to economically realize substantially all the advantages of grinding the faces, I have provided projections 16 on the faces 15 adapted to engage the teeth of the sprocket wheel. The projections 16 are more or less sharp and of such limited area that they will crush under the pressure of driving until all of the projections strike the faces of the teeth, after which they gradually wear down thus effecting a substantial contact area as wear progresses. By this novel and simple arrangement an engagement across the entire face of the chain, preventing bending strains in the joint pins can be obtained, it being pointed out that the projections may be formed when punching the links from the sheet stock, thus eliminating the use of extra equipment and labor. In short I have provided a chain having the hereinbefore stated advantages, which can be manufactured at practically the same cost as those falling short of such advantages.

I claim:—

1. A drive chain comprising links formed of a plurality of plates, pintles for joining said links, the plates of one link being interspersed with the plates of the adjacent links, and projections on the tooth contacting surfaces of the plates adapted to crush in service for establishing tooth contact with all the plates.

2. A drive chain comprising links formed of a plurality of plates, pintles for joining said links, the plates of one link being interspersed with the plates of the adjacent links, and projections on the tooth contacting surfaces of the plates for establishing tooth contact with all the plates as the projections wear.

3. A drive chain comprising links formed of a plurality of plates, pintles for joining said links, the plates of one link being interspersed with the plates of the adjacent links, and small wearing-in projections for aligning the tooth contacting surfaces of the plates without excessive strains on the pintles.

4. A plate for plural link drive chains having a wearing-in projection on the tooth contacting surface thereof.

In testimony whereof, I have hereunto signed my name.

FRANK L. MORSE.